MAGNETIC THIN FILM DATA STORAGE UNIT IN A BRIDGE-LIKE ARRANGEMENT
Filed May 4, 1965

INVENTOR
JU C. TU
BY [signature]
ATTORNEYS

United States Patent Office 3,474,420

Patented Oct. 21, 1969

3,474,420

MAGNETIC THIN FILM DATA STORAGE UNIT IN A BRIDGE-LIKE ARRANGEMENT

Ju C. Tu, Sylmar, Calif., assignor to Singer-General Precision, Inc., a corporation of Delaware Filed May 4, 1965, Ser. No. 453,087
Int. Cl. G11b 5/44, 5/00
U.S. Cl. 340—174 15 Claims

ABSTRACT OF THE DISCLOSURE

A data storage unit in the form of a bridge-like arrangement of two parallel branches, connected across a digit driver is disclosed. Each branch includes two serially connected magnetic plated wires, with a sense amplifier connected to the junction point between the two wires in each branch. An insulated wire, connectable to a word driver, is inductively coupled to two plated wires which are in two different branches, the coupling being at points equidistant from the sense amplifier.

This invention relates to computer memory and, more particularly, to an improved data storage unit in a memory utilizing magnetic thin film as the storage media.

In recent years, woven computer memories have been developed in which binary data is storable in thin magnetic films plated on nonmagnetic wires which are interwoven with nonmagnetic insulated wires to form a woven memory plane. Generally, a binary bit is stored, by controlling the polarity of current in one of the plated wires, in order to control the direction of magnetization or direction of the original circumferential flux at the point of intersection of the plated wire and the particular insulated wire. Binary data can be sensed nondestructively by passing a current through one of the insulated wires woven orthogonally to the plated wires. This current establishes an axial magnetic field which temporarily modifies the original direction of magnetization of the film, so as to induce a current in the plated wire, which is connected to a sensitive sense amplifier. The sign of the current induced in the plated wire is a function of the original circumferential flux direction, so that the sense amplifier indicates the binary data stored in the film.

It is thus seen that the plated wire performs a dual function. It serves as a write line, providing a current, which together with the current in one of the insulated wires controls the direction of magnetization of a portion of the film. It also acts as a sense line by providing a current to the sense amplifier during data readout, whereby the sensed polarity of the current indicates the binary value of the stored data.

The magnitude of the current in the plated wire, when serving as a write line is several thousand times larger than the normal current in the wire, when sensing the stored data. In order that the sense amplifier be ready to sense or read stored data immediately after a write cycle, it is necessary to prevent the very large write current from reaching or affecting the sense amplifier without affecting the writing operation. Otherwise, an appreciable time period must elapse for the sense amplifier to recover from the effect of the large write current, before it is in a quiescent condition to sense the low level current signal which indicates the stored binary data. In addition, it is necessary to minimize the effects of nonconductive coupling between the plated wire and the insulated wires to insure that the pulses sensed by the sense amplifier do not represent spurious coupling effects between the wires, but rather indicate the true state of the stored binary data. Thus, a need exists for an arrangement to protect a sense amplifier in a thin film memory from undesired conditions or phenomenon which may arise, while writing data into the memory, or when reading out data therefrom.

Accordingly, it is an object of the present invention to provide a novel data storage unit.

Another object of the invention is to provide a new simple arrangement for storing data in a thin magnetic film and for reading out the data therefrom.

Still another object is the provision of a novel arrangement for protecting a sense amplifier in a magnetic thin film type memory from spurious signals which generally occur while data is stored in, or readout of, the memory.

A further object of the invention is to provide a simple data storage unit in a magnetic thin film memory so as to greatly reduce the recovery time of a sense amplifier associated with the unit from any spurious signals.

These and other objects of the invention are achieved by providing a data storage unit in a magnetic thin film memory in which each binary bit is stored in two points or sections of two plated wires, which together with two other plated wires form a four node bridge-like arrangement. Two of the nodes are used to connect the unit to a driver to provide the necessary write current, while the other two nodes are used to connect a sense amplifier to the unit. As a result, the write driver and the sense amplifier are connected across a balanced bridge arrangement, so that the large write current conducting through the plated wires between the nodes connecting the write driver to the unit will not affect the sense amplifier connected to the other two nodes. Thus, the effect of conductive coupling between the write driver and sense amplifier is substantially eliminated, thereby greatly reducing any necessary recovery time of the sense amplifier due to the large write currents in the plated wires.

In practice in each unit two diagonally opposed plated wires on either side of the sense amplifier are orthogonally interwoven with an insulated wire, so that each binary bit is stored at two separate sections or points of two of the four plated wires. The particular sections of the two plated wires in which a binary bit is stored are chosen with respect to the sense amplifier in such a manner that any spurious signals, produced by the capacitive coupling between the plated wires, and the insulated wire during readout, are equally delayed to minimize the effect of such signals on the sense amplifier.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
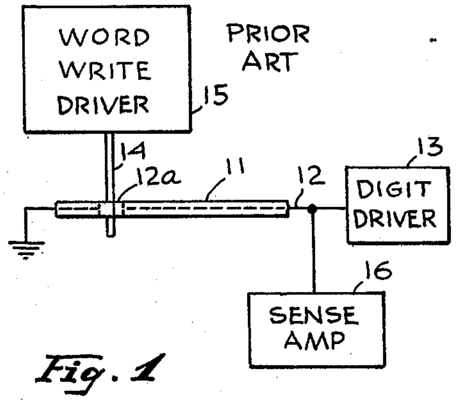
FIGURE 1 is a simplified block diagram of a prior art data storage unit utilizing a magnetic thin film plated wire.

Referring to FIGURE 1, there is shown a prior art data storage unit in which binary data may be stored in a thin magnetic film 11 deposited or plated on a nonmagnetic wire 12. As is appreciated by those familiar with the art, the wire 12 is generally connected to a digit write driver 13 and is orthogonally woven by an insulated wire 14. The insulated wire is connected to a word-write driver 15. A binary bit such as a "one" may be stored at the point of intersection of plated wire 12 and wire 14, designated in FIGURE 1 by numeral **12*a* by controlling the polarity and magnitude of the current in the wire 12, so that the circumferential flux about point 12*a* is in a particular direction. The current in wire 14 is generally of the same polarity and magnitude whether a "zero" or a "one" is stored. A "zero" is stored by controlling the current in wire 12** to be of the same magnitude as when storing a "one," but of opposite polarity so that the flux is in an opposite direction to that which represents a "one."

As seen from FIGURE 1 the data storage unit also includes a sense amplifier 16 which is connected to the plated wire 12. The function of the amplifier 16 is to sense and indicate the binary bit stored in section 12*a* by sensing the polarity of current which is induced in wire 12 as a function of an interrogation current in wire 14, supplied from driver 15 during readout. The polarity of the current induced in wire 12 is a function of the magnitude of the interrogate current and the direction of circumferential flux at section 12*a*, the latter being dependent on the binary data stored thereat. Thus, by sensing the polarity of current induced in wire 12, such current, also known as the read current, the binary data previously stored at 12*a* is determined.

The amplifier 16 is designed to be quite sensitive, since the read current induced in wire 12, irrespective of polarity, is quite small. On the other hand, during the storing of data in the thin film 11, the write current from driver 13 is quite large, generally being several thousand times the value of the read current. Such a large write current adversely affects the sensitive sense amplifier, so that a relatively long time period must elapse before the amplifier is quite enough, or noiseless, to sense a low level read current induced during a subsequent read cycle of operation. Consequently, the speed at which the data storage unit can be operated depends on the ability to prevent the sense amplifier, used for data readout from being affected by write currents. In the prior art, this problem could only be solved by using various signal decoupling techniques which generally required the use of transformers, thus resulting in a complex memory arrangement.

Another disadvantage of the prior art arrangement is the capacitive coupling between wires 14 and 12 during a read cycle of operation. When the interrogate current is supplied by driver 15, the capacitive coupling between wires 14 and 12 induces a very small signal, which may be sensed by the highly sensitive amplifier 16. This signal, due to capacitive coupling is independent of the binary data stored at section 12*a*. It represents an undesired noise signal, which may occasionally interfere with the ability of the amplifier to resolve the characteristics of the binary data stored at section 12*a*, as a function of the polarity of the current induced in wire 12. Capacitive coupling in prior art magnetic thin film memories has been found to be quite disturbing, since it accounts for undesired noise, in a system which must be sensitive enough to sense and identify low level signals.

Figure 2:
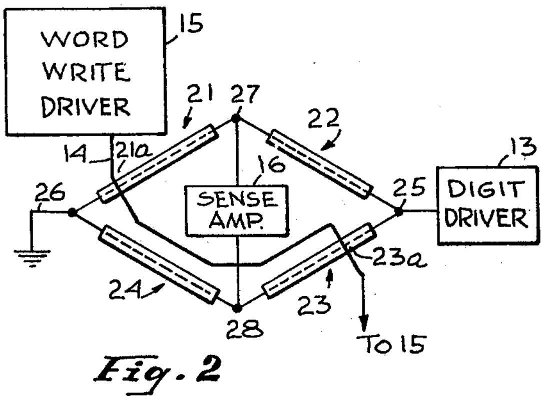
FIGURE 2 is a block diagram of the novel data storage unit of the present invention.

Reference is now made to FIGURE 2 which is a simplified block diagram of a data storage unit constructed in accordance with the teachings of the present invention. As seen, four plated wires 21 through 24 are connected in a bridge-like arrangement forming nodes 25, 26, 27 and 28. Each of the wires is plated with a magnetic thin film similar to wire 12 with the magnetic film 11. The write driver 13 is shown connected to node 25, with node 26 being connected to a reference potential, such as ground. Thus, a write current from the driver 13 flows between nodes 25 and 26 through two potential branches. One branch comprises serially connected plated wires 22 and 21 and the other comprises serially connected wires 23 and 24. The sense amplifier 16 is connected to nodes 27 and 28.

The insulated wire 14 which in the prior art is orthogonally woven about a single plated wire such as wire 12 (FIGURE 1), in the arrangement of the present invention crosses over two plated wires, such as wires 21 and 23. The two wires are on either side of amplifier 16, with each being connected to two different nodes, of the nodes 25 through 28. Thus, in operation each binary bit is stored in two different sections 21*a* and 23*a* of the thin magnetic films on wires 21 and 23 respectively. Namely, during a write cycle of operation the magnitude and polarities of the currents from drivers 13 and 15 are controlled, so that the circumferential flux about both sections 21*a* and 23*a* is in one direction when a "one" is stored and in an opposite direction when a "zero" is stored.

It should be appreciated by those familiar with the art, that by connecting the sense amplifier 16 across two of the nodes in the bridge-like arrangement shown in FIGURE 2, the effects of a large current from driver 13 on the amplifier 16 during a write cycle are substantially eliminated. This is due to the fact that since wires 22 and 23 are assumed to be similar, the potential drop across each one of them is the same, so that the potential difference between nodes 27 and 28 or across amplifier 16 is zero. Thus, even though driver 13 provides the plated wires with a large current, when data is written into the wires, the sense amplifier is unaffected by such a conducting current despite the fact that the sense amplifier is directly connected to the current conducting wires.

It is thus seen that by practicing the teachings of the invention, it is possible to directly couple the sense amplifier to the current conducting plated wires without resort to transformers, while at the same time prevent the large write currents from affecting the amplifiers. Since the amplifier remains undisturbed during the write cycle, it is in a quiescent condition to detect a read current during a subsequent read cycle, which due to the noiseless amplifier can be performed without delay. Thus the time delay between each read cycle and a preceding write cycle is greatly reduced, thereby substantially increasing the speed at which data can be written in or read out of the memory.

As seen from FIGURE 2, sections 21*a* and 23*a* of plated wires 21 and 23 respectively in which a single binary bit is assumed to be stored, are chosen to be equidistant from nodes 27 and 28 respectively i.e. from amplifier 16. As previously explained in connection with FIGURE 1, during the read cycle the interrogate current from driver 15 produces capacitive coupling between wires 14 and 12 which may affect the reading of the amplifier 16. However, in the present invention, by equidistantly spacing sections 21*a* and 23*a* from amplifier 16, any spurious signals due to the capacitive coupling of wire 14 with wires 21 and 23 are equally time delayed so that they arrive in time coincidence at nodes 27 and 28. And due to their common mode, they effectively cancel each other at the amplifier.

From the foregoing, it should thus be appreciated that by connecting four plated wires as shown in FIGURE 2, it is possible to directly couple a sensitive amplifier to the plated wires while greatly minimizing adverse affects of noise on the amplifier due to large conductive currents during a write cycle, or due to capacitive coupling during a read cycle. It is apparent to those familiar with the art, that a plurality of binary bits may be stored per linear inch of plated wire. A plurality of data storage units such as that shown in FIGURE 2 may be interwoven with a plurality of insulated wires orthogonally woven with respect to each unit to form a woven memory plane. Each unit may represent a multibit word with each orthogonal insulated wire controlling the storing of a different digit. Similarly, as hereinbefore described, each unit may represent a different digit with each insulated wire representing a different word so that a different bit of each word is stored in a different unit.

Figure 3:
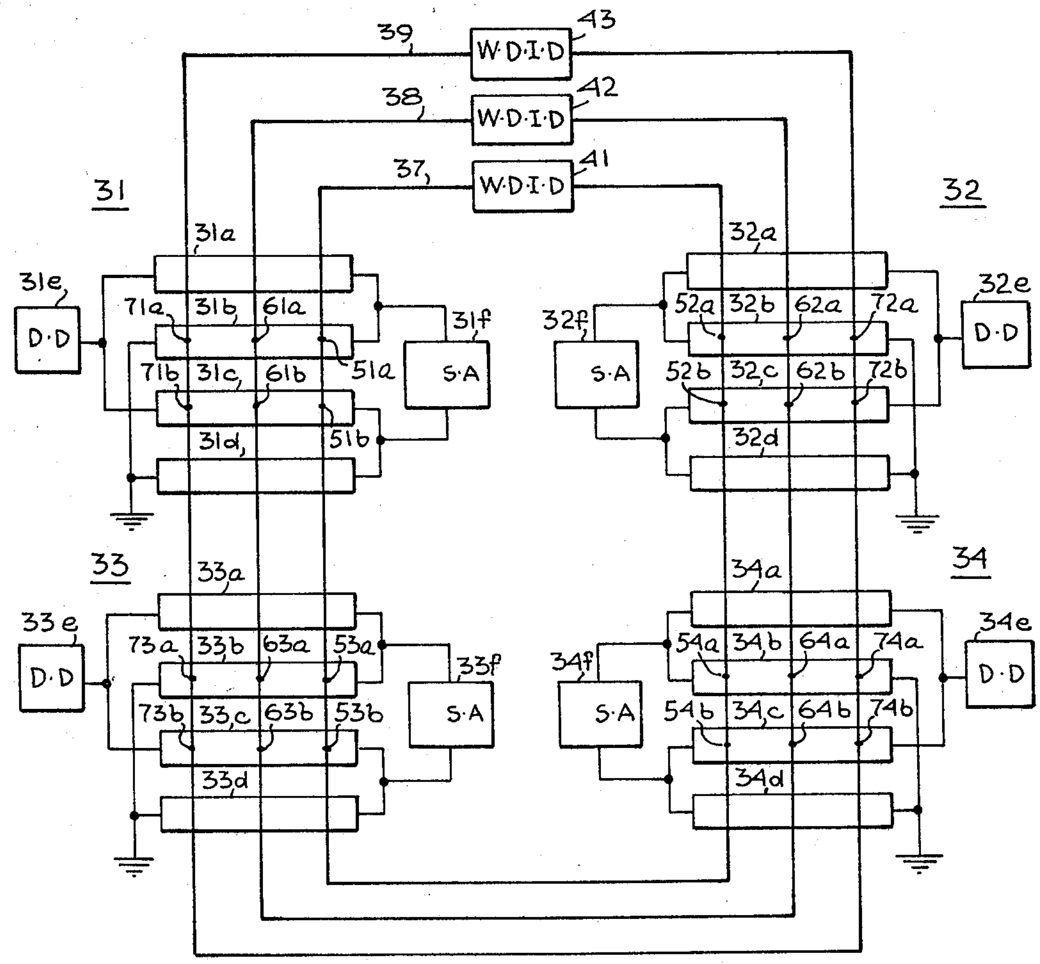
FIGURE 3 is a block diagram of a four bit three word memory constructed in accordance with the present invention.

Reference is now made to FIGURE 3 which is a simplified block diagram of a four bit three word memory, constructed in accordance with the teachings of the invention. The four bits are represented by units 31 through 34, each comprising four plated wires designated by subscripts *a* through *d*. In each unit, the four plated wires are connected in a bridge-like arrangement as shown in FIGURE 2, to a digit driver (DD) and a digit sense amplifier (SA) coupled thereto. The DD and the SA associated with each unit are designated by subscripts *e* and *f* respectively.

Three insulated wires 37, 38 and 39 which are connected to word-write and interrogate drivers (WDID) 41, 42 and 43 respectively are orthogonally interwoven with the various plated wires in such a manner that at each unit each insulated wire inductively couples or crosses two of the plated wires. The crossings are designed by points such as points 51*a* and 51*b* which represent the coupling between wire 37 and plated wires 31*b* and 31*c* respectively. Thus, by controlling the current from DD[s] 31*e*, 32*e*, 33*e* and 34*e* and the driver 41, a first word can be stored in plated wires 31*b* and 31*c*, 32*b* and 32*c*, 33*b* and 33*c*, 34*b* and 34*c* at points 51*a* and 51*b*, 52*a* and 52*b*, 53*a* and 53*b*, 54*a* and 54*b* respectively. The currents from drivers 42 and 43 are similarly controllable to control the store, and the second and third words in a similar manner.

The reading out of the stored bits of any of the words is conveniently accomplished by providing an interrogate current in any one of wires 37, 38 and 39 supplied from one of drivers 41, 42 and 43 respectively, so that the sense amplifiers 31*f*, 32*f*, 33*f* and 34*f* sense in parallel the stored bits of the particular word. The entire memory may be woven by employing known weaving techniques in order to achieve a very high bit density per unit area.

There has been accordingly described and shown herein a novel data storage unit utilizing magnetic thin film which is plated on a nonmagnetic wire as the storage medium. The unit is particularly adapted to be directly coupled to a sense amplifier which is not affected by undesired noise signals, often produced during data write-in or data readout. It is appreciated that those familiar with the art may make modifications in the arrangements as shown without departing from the true spirit of the invention.

What is claimed is:

1. A data storage unit comprising:
four nonmagnetic wires, each having magnetic film plated thereon;
means for connecting said four plated wires in a bridge-like arrangement comprising two parallel branches, each branch including two serially connected plated wires;
a first current source;
means for connecting said first current source across said two parallel branches for providing a first current to said plated wires;
an insulated wire coupled to at least one plated wire in each bridge-like arrangement;
a second current soure;
means for connecting said second current source to said insulated wire for inducing a second current therethrough for storing a bit in a portion of said at least one plated wire as a function of said first and second currents, said second current source further providing an interrogate current in said at least one plated wire for inducing a signal in said plated wire as a function of the bit stored in the portion thereof; and
sense means directly connected to said four nonmagnetic wires across said two parallel branches for sensing the signal induced in said at least one plated wire.

2. A data storage unit as recited in claim 1 wherein said insulated wire is coupled to two plated wires in opposite branches of each bridge-like arrangement for storing said bit in a portion in each of said two plated wires.

3. A data storage unit as recited in claim 2 wherein said two portions of said two plated wires are equidistant from said sensing means.

4. A data storage unit comprising:
first, second, third and fourth nonmagnetic wires each having magnetic film plated thereon, and first and second ends;
means for joining the first ends of said first and second plated wires to form a first junction;
means for joining the second end of said first plated wire and the first end of said fourth plated wire to form a second junction;
means for joining the second end of said second plated wire and the first end of said third plated wire to form a third junction;
means for joining the second ends of said third and fourth plated wires to form a fourth junction;
a sense amplifier directly coupled to said second and third junctions;
a first current source coupled to said first and fourth junctions for providing a first current in said plated wires;
an insulated wire orthogonally crossing portions of said first and third plated wires; and
a second current source coupled to said insulated wire for providing a second current in said insulated wire for storing a bit of data in said portions of said first and third plated wires as a function of the magnitudes and polarities of said first and second currents.

5. A data storage unit as recited in claim 4 wherein said first and second currents are controllable to control the circumferential flux about each of said portions to be in a first direction for storing a first bit and in a second opposite direction for storing a second bit.

6. A data storage unit as recited in claim 5 wherein the portion of said first plated wire and the portion of said third plated wire are equidistant from said second and third junctions respectively, so as to minimize the effects on said sense amplifier produced by capacitive coupling between said insulated wire and said first and third plated wires.

7. In a memory plane comprising a plurality of magnetic film plated wires interwoven with a plurality of insulated wires wherein bits of data are stored in portions of said magnetic film plated wires as a function of the combination of currents in the plated wires and in the insulated wires interwoven therewith, said currents being supplied from first and second pluralities of current sources coupled to said plated wires and said insulated wires respectively, said memory plane further including a plurality of sensing means for sensing the bits stored in the portions of said plated wires by sensing the signals induced in said plated wires as a function of currents from said second plurality of current sources, the improvement comprising:
means for joining said plurality of magnetic film plated wires in a plurality of bridge-like data storage units, each unit comprising four plated wires, arranged in two parallel branches each branch comprising two plated wires connected at a junction point;
means for connecting each of said first current sources across the two parallel branches of each of said data storage units; and
means for directly connecting each of said second current sources across the junction points of the two branches of each of said data storage units whereby the potential difference between the two junction points in each unit as a function of current from each of said first current sources is substantially zero so that the sensing means connected to said points is unaffected by the current from said first current source.

8. In a memory plane as recited in claim 1 wherein said improvement further comprises:
means for coupling each of said insulated wires with two plated wires of each of said units so as to store each bit in another portion of each of said plated wires, for reducing the effect of coupling between the insulated wires and the plated wires on the sensing means connected to said unit.

9. In a memory plane as recited in claim 8 wherein the two plated wires in each bit is stored are in opposite branches of said unit and diagonally opposed to one another with respect to the sensing means connected to said unit.

10. In a memory plane as recited in claim 9 wherein the portions of said two plated wires wherein each bit is stored are equidistant from the two junction points of said unit to which said sensing means are directly connected.

11. A data storage unit comprising:
first, second, third and fourth nonmagnetic wires, each having magnetic film plated thereon;
means for connecting said plated wires in a bridge-like arrangement with the junction between each pair of plated wires forming a node;
a first source of current;
means for connecting said first source of current acoss to opposite nodes of said bridge-like arrangements;
means for connecting a sense amplifier across two other opposite nodes of said bridge-like arrangement;
an insulated wire orthogonally woven across two portions of two of said four plated wires; and
a second source of current coupled to said insulated wire for storing a bit of data in said portion as a function of the current supplied to said plated wires by said first source of current and the current supplied to said insulated wire by said second source of current.

12. A data storage unit comprising:
four current-conducting wires, at least two having magnetic film plated thereon;
means for connecting said four wires in a bridge-like arrangement comprising two parallel branches, each branch including two serially connected wires, at least one being a plated wire;
a first current source;
means for connecting said first current source across said two parallel branches for providing a first current to said wires;
an insulated wire coupled to at least one plated wire in each bridge-like arrangement;
a second current source;
means for connecting said second current sources to said insulated wire for inducing a second current therethrough for storing a bit in a portion of said at least one plated wire as a function of said first and second currents, said second current source further providing an interrogate current in said at least one plated wire as a function of the bit stored in the portion thereof; and
sense means directly connected to said four nonmagnetic wires across said two parallel branches for sensing the signal induced in said at least one plated wire.

13. A data storage unit as recited in claim 12 wherein said insulated wire is coupled to two plated wires in opposite branches of said bridge-like arrangement for storing said bit in a portion in each of said two plated wires; and
wherein said two portions of said two plated wires are equidistant from said sensing means.

14. A data storage unit comprising:
first, second, third and fourth current-conducting nonmagnetic wires, at least said first and third wires having magnetic film plated thereon, each wire having first and second ends;
means for joining the first ends of said first and second wires to form a first junction;
means for joining the second end of said first wire and the first end of said fourth wire to form a second junction;
means for joining the second end of said second wire and the first end of said third wire to form a third junction;
means for joining the second ends of said third and fourth wires to form a fourth junction;
a sense amplifier directly coupled to said second and third junctions;
a first current source coupled to said first and fourth junctions for providing a first current in said wires;
an insulated wire orthogonally crossing portions of said first and third plated wires; and
a second current source coupled to said insulated wire for providing a second current in said insulated wire for storing a bit of data in said portions of said first and third plated wires as a function of the magnitudes and polarities of said first and second currents.

15. A data storage unit as recited in claim 14 wherein said first and second currents are controllable to control the circumferential flux about each of said portions to be in a first direction for storing a first bit and in a second opposite direction for storing a second bit, wherein the portion of said first plated wire and the portion of said third plated wire are equidistant from said second and third junctions, repectively, so as to minimize the effects on said sense amplifier produced by capacitive coupling between said insulated wire and said first and third plated wires.

References Cited

UNITED STATES PATENTS

| | | | |
|---|---|---|---|
| 3,209,337 | 9/1965 | Crawford | 340—174 |
| 3,315,086 | 4/1967 | Oshima et al. | 307—88 |
| 3,325,793 | 6/1967 | Simkins et al. | 340—174 |

BERNARD KONICK, Primary Examiner

B. L. HALEY, Assistant Examiner